Jan. 22, 1924.   
J. L. BAILLE   
1,481,673

COMBINED ROLL HOLDING AND PLATE CAMERA

Filed Feb. 6, 1923

Inventor
J. L. Baille,
By Marks & Clerk
Atty.

Patented Jan. 22, 1924.

1,481,673

UNITED STATES PATENT OFFICE.

JEAN LOUIS BAILLE, OF PARIS, FRANCE, ASSIGNOR TO SOCIETE BAILLE-LEMAIRE ET FILS, OF PARIS, FRANCE, A CORPORATION OF FRANCE.

COMBINED ROLL-HOLDING AND PLATE CAMERA.

Application filed February 6, 1923. Serial No. 617,369.

*To all whom it may concern:*

Be it known that I, JEAN LOUIS BAILLE, a citizen of the French Republic, residing at 26 Rue Oberkampf, Paris, France, have invented certain new and useful Improvements in a Combined Roll-Holding and Plate Camera, of which the following is a specification.

Photographic apparatuses which utilize films in spools can also receive frames containing glass plates, but in this case the frames fit against the rear part or back of the apparatus, which is normally adapted to prevent the infiltration of light in the apparatus, when the band of films is unwound. In these conditions, it is necessary to take into account, for the focusing of the glass plate, the difference existing between the plane in which the band of films normally presents itself and that in which the glass plate is located; consequently, two focusing scales are necessary, owing to the fact that distinct positions of the objective correspond to one and the same focusing on each of these two planes.

The device forming the subject-matter of the invention is adapted to avoid this inconvenience which is a cause of error; it is characterized in that the frames containing the glass plates are placed at the rear part of the apparatus when the latter is open and not, in the known manner, when it is closed. Each frame is slid at the place where passes the band of films, so that the plate it contains is exactly in the same plane as the film it replaces. But in order that the putting in place of this frame may take place without difficulties, one of the rollers on which is stretched the film must be removed from the slideway.

The accompanying drawing illustrates by way of example a form of carrying out the method in accordance with the invention, in which the removal of one of the stretching rollers for the film automatically takes place through the opening of the apparatus.

Figure 1:
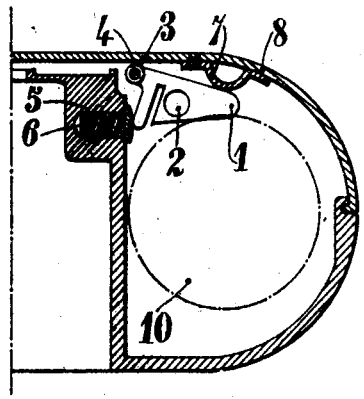
Figs. 1 and 3 are an elevation and a plan view respectively of a closed apparatus.

When a roll of films 10 is placed in the apparatus and the band is unwound, the said band is at the point 3 tangent to the roller 4. The said roller 4 is carried by a member 1 capable of rotating about an axis 2. This member 1 is held in the position indicated in Fig. 1 by means of the member 7 secured to the back 8.

Figure 2:
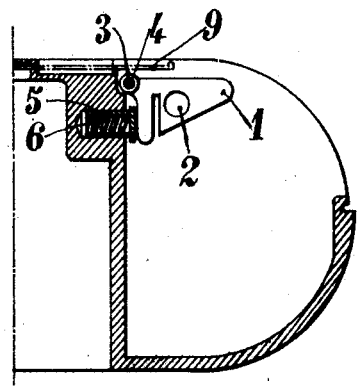
Figs. 2 and 4 are corresponding views, the apparatus being open.
Figure 3:
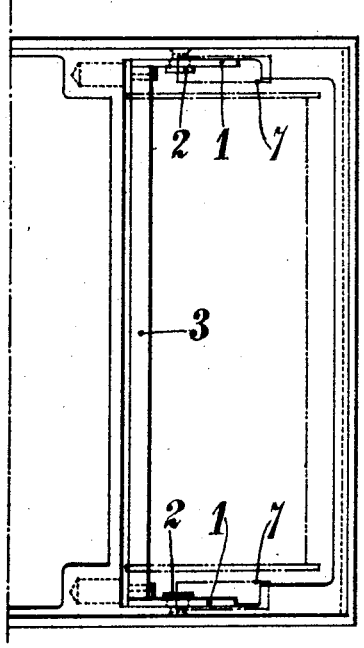
Figure 4:
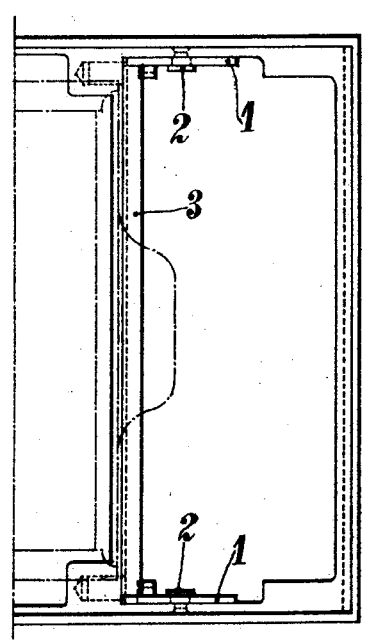

When the back is removed (Fig. 2) the member 1 which is no longer held in its primitive position is pushed back by the slide-block 5 which is subjected to the action of the spring 6. The member 1 thus rotates about its axis and drives the roller 4 which moves away and leaves free passage to a frame containing a glass plate.

It is to be understood that the opening of this passage can be obtained automatically or not by any other means as for instance by removing by hand the roller, by releasing it from the members on which it rests, or by raising it, or yet by holding it.

What I claim as my invention and desire to secure by Letters Patent is:

1. In a film photographic apparatus, a tension roller for the film arranged at the upper or lower part of the apparatus, an axis supporting this roller, a lever secured at each end of the said axis, an axis of rotation for each lever, resilient means acting on each lever for bringing back the rollers inwardly, means for moving the rollers outwardly when the apparatus is closed.

2. In a film photographic apparatus, a tension roller for the film arranged at the upper or lower part of the apparatus, an axis supporting this roller, a lever secured at each end of the said axis, an axis of rotation for each lever, resilient means acting on each lever for bringing back the rollers inwardly, an abutment on the cover of the apparatus, an extension of each lever on which this abutment bears when the apparatus is closed.

3. In a film photographic apparatus, a tension roller for the film arranged at the upper or lower part of the apparatus, an axis supporting this roller, a lever secured at each end of the said axis, an axis of rotation for each lever, resilient means acting on each lever for bringing back the rollers inwardly, slide-blocks bearing on each lever and guided in the frames, springs acting on these slide-blocks, an abutment on the cover of the apparatus and an extension of each lever on which this abutment bears when the apparatus is closed.

In testimony whereof I have signed my name to this specification.

JEAN LOUIS BAILLE.